United States Patent [19]

Ancker

[11] Patent Number: 4,873,116

[45] Date of Patent: Oct. 10, 1989

[54] METHOD OF PREPARING MIXTURES OF INCOMPATIBLE HYDROCARBON POLYMERS

[75] Inventor: Fred H. Ancker, Warren, N.J.

[73] Assignee: Union Carbide Chemicals and Plastics Company Inc., Danbury, Conn.

[21] Appl. No.: 913,517

[22] Filed: Sep. 30, 1986

[51] Int. Cl.$^4$ ............................................. C08L 23/00
[52] U.S. Cl. ................................. 428/36.9; 523/200;
523/202; 523/203; 523/205; 523/206; 523/209;
523/212; 524/269; 524/424; 524/425; 524/436;
524/473; 524/445; 524/451; 524/528; 525/193
[58] Field of Search ............... 523/202, 203, 209, 212,
523/206, 200, 205; 525/93, 193; 524/528,
269, 424, 925, 438, 473, 445, 451; 428/36.9

[56] References Cited

U.S. PATENT DOCUMENTS

| | | | |
|---|---|---|---|
| Re. 31,992 | 8/1985 | Ancker et al. | 523/202 |
| 3,261,885 | 7/1966 | Craubner et al. | 260/857 |
| 3,299,176 | 1/1967 | Longworth | 260/876 |
| 3,645,939 | 2/1972 | Gaylord | 525/193 |
| 3,993,718 | 11/1976 | Bontinck et al. | 525/931 |
| 4,251,424 | 2/1981 | Pagilagan | 260/30.8 |
| 4,283,459 | 8/1981 | Urban et al. | 428/379 |
| 4,385,136 | 5/1983 | Ancker et al. | 523/215 |
| 4,409,342 | 10/1983 | Ancker et al. | 523/203 |
| 4,481,322 | 11/1984 | Godlewski et al. | 524/265 |

FOREIGN PATENT DOCUMENTS

| | | | |
|---|---|---|---|
| 102039 | 9/1976 | Japan | 525/193 |
| 6155213 | 12/1981 | Japan | 525/193 |
| 139765 | 7/1985 | Japan | 525/193 |
| 828895 | 2/1960 | United Kingdom . | |
| 832193 | 4/1960 | United Kingdom . | |
| WO8502858 | 7/1985 | World Int. Prop. O. . | |

OTHER PUBLICATIONS

"Production of Natural Rubber-Synthetic Rubber Interpolymers by Cold Mastication" By D. J. Angier & W. F. Watson, Transactions, I.R.I. vol. 33 (1957) pp. 22-32.

"Polymerisation of Admixed Monomers by the Cold Mastication of Rubber" By D. J. Angier & E.D. Farlie, Transactions I.R.I., vol. 34 (1958) pp. 8-19.

"The Potential for Reuse of Plastics Recovered from Solid Wastes" By D. R. Paul, C. E. Vinson & C. E. Locke, Polymer Engineering and Science, vol. 12, No. 3 pp. 157-166, (1972).

"Stress-Strain Behavior of Polyolefin Blends" by R. E. Robertson & D. R. Paul, Journal of Applied Polymer Science vol. 17, (1973) pp. 2579-2595.

*Primary Examiner*—John C. Bleutge
*Assistant Examiner*—David W. Woodward
*Attorney, Agent, or Firm*—Paul W. Leuzzi

[57] ABSTRACT

A method of preparing mixtures of incompatible hydrocarbon polymers using a novel compatibilizing system. The compatibilizing system comprises a mineral filler and certain reinforcement additives. Flame retardant compositions and articles fabricated from such compositions also are disclosed.

38 Claims, No Drawings

METHOD OF PREPARING MIXTURES OF INCOMPATIBLE HYDROCARBON POLYMERS

BACKGROUND OF THE INVENTION

1. Field of Invention

The present invention relates to the preparation of useful polymer compositions from mixtures of incompatible thermoplastic hydrocarbon polymers using a novel compatibilizing system. The invention also relates to novel compositions produced according to the process and articles fabricated from such compositions.

In general, thermoplastic hydrocarbon polymers are not readily combined into useful materials to produce new compositions since these polymers are of high molecular weight and contain large chain molecules.

In contrast to low molecular weight liguids, high molecular weight materials, such as hydrocarbon polymers, are only rarely "soluble" in each other. The reason is evident from basic thermodynamics. The fundamental driving force for solubility or miscibility is the change in free energy for the mixing process. This change must be negative for two materials to be soluble in each other. The free energy in turn has two components, an enthalpy or energy term and an entropy or statistical term. For small molecules, the entropy term usually dominates: the mixing of two components leads to a vast increase in possible distinguishable molecular arrangements, hence mixing of small molecules causes a large increase in entropy. The energy (enthalpy) change occurring as a result of mixing depends in turn on the net difference between the energy extended in separating the molecules of each component from each other versus the energy gained by the contact of the dissimilar-molecules of the mixture. If more energy is gained than extended, the mixing process is exothermic. If more energy must be expended than is gained, the mixing process is endothermic. Due to the large entropy gain in the case of small molecules, the components can have fairly large mixing endotherms and still be miscible, hence low molecular weight liquids can be fairly dissimilar and still remain homogeneous single phase systems when mixed.

This situation changes drastically as the molecular weight of both components increase: as the molecules become larger, the number of molecules decrease, fewer distinguishable arrangements can be made and the entropy effect rapidly becomes insignificant. Therefore, the energy (enthalpy) term dominates polymer melt blends. For this reason, unless two polymers have preferred (exothermic) molecular interactions, they will generally not be miscible.

Therefore, given the relatively high molecular weight of thermoplastic hydrocarbon polymers they are rarely soluble or even miscible in another. The vast majority of pairs of different thermoplastic hydrocarbon polymers form heterogenous blends when mixed and are therefore incompatible. The degree or extent of heterogeneity or incompatibility varies, of course, with the detailed structures of the given polymer pair. (For a more detailed discussion including descriptions of individual polymer systems, see "Polymer/Polymer Miscibility", by O. Olabisi et al., New York (Academic Press), 1979 and the literature references cited therein).

2. Description of Prior Art

Since most pairs of different hydrocarbon polymers are incompatible the most common approach which has been used to produce new hydrocarbon compositions is copolymerization, i.e., the polymer components are combined while still in a prepolymer state as monomers. This approach has created numerous commercially important materials such as random, block and graft copolymers from a wide range of monomers. However, copolymers are generally more expensive to make than the individual homopolymers and copolymerization does not provide a solution to the general problem of making useful blends from already existing polymers.

Another method of producing new hydrocarbon compositions was developed in the 1950s by W. F. Watson and coworkers at the British Rubber Producers' Research Association, as noted for example in British patent No. 828,895 dated May 7, 1956 and the article entitled "Polymerization of Admixed Monomers by the Cold Mastication of Rubber", Transactions I.R.I., vol. 34(1), 1958, pp. 8-19. These researchers demonstrated that the addition of monomers capable of free radical addition polymerization to a rubber during intensive mixing conditions can lead to formation of graft copolymers with unique and useful properties. Initiation of the grafting reaction is caused by free radicals formed by mechanical and thermal rupture of the rubber molecules during the intensive, high shear compounding and at least part of the monomer is polymerized into branches off the original polymer. However, this method does not produce new compositions from combinations of existing high polymers.

However, the same researchers demonstrated that it is possible under controlled conditions of high intensity compounding to create grafted interpolymers of two different rubbers. See, British patent No. 832,193 dated May 7, 1956 and the article entitled "Production of Natural Rubber Synthetic Rubber Interpolymers by Cold Mastication", Transactions I.R.I., vol. 33, 1957, pp. 22-32. It is today common practice in the rubber industry to use formulations containing more than one rubber type. It is important to note, however, that in addition to the interlinking which occurs during the intensive compounding conditions employed, rubber compounds must further be cured in order to achieve useful mechanical properties. The curing process creates additional polymer/polymer interlinking. Thus, blends of thermosetting polymers such as sulfur-cured (vulcanized) rubber compositions produced from blends of different rubber elastomers have been in commercial use for many years.

In contrast, attempts over the years to create useful blends of thermoplastic polymers by high intensity mixing have been less successful, even for polymers as close in composition as the olefin homo and copolymers. Illustrative of this point, is the article by R. E. Robertson and D. R. Paul entitled "Stress-Strain Behavior of Polyolefin Blends", J. Applied Polymer Science, Vol. 17, pp. 2579-2595, 1973. FIGS. 1, 3, 4 and 5 in this article show a precipitous drop in ductility, as measured by the elongation at break, for blends of polypropylene homopolymer with either low density polyethylene (LDPE) or high density polyethylene homopolymer (HDPE) in comparison with the properties of the components. Even blends of LDPE and HDPE suffer a noticeable loss in ductility on blending as compared to what would be expected from the mean values of the neat constituents. For polymers of more diverse composition, the problems are generally much worse. See, the article by D. R. Paul et al. entitled "The Potential for Reuse of Plastics Recovered from Solid Wastes", Polymer Eng. and Science, Volume 12, pages 157–166, 1972, covering the properties of polyethylene (PE), polystyrene (PS) and polyvinylchloride (PVC) blends. The data in this article (see, for example FIG. 4), clearly show that not only the ductility, but also the strength of the compositions is severely impaired by blending.

Another approach to the problem of blending preexisting hydrocarbon polymers has been to add free radical initiators during compounding. For example, U.S. Pat. No. 3,261,885, dated July 19, 1966, describes the preparation of blends of polyolefins and polyamides by hot compounding in the presence of a peroxide as a free radical initiator. Although these techniques often can provide compositions which have better mechanical properties than simple blends compounded together without the use of free radical initiators, these processes run to completion rapidly and are very difficult to control. The production of a consistent product grade is therefore, difficult. The products may also be partially crosslinked which makes them difficult to fabricate by injection molding and extrusion. Another disadvantage of the use of free radical initiators is that the decomposition products of the initiators are odoriferous materials which produce an unpleasant smell in the product.

An additional approach has been to add a "compatibilizing" component such as a lubricant or soap or, preferably, a copolymer containing chain segments similar or identical to one or both of those in the component thermoplastic polymers Examples of low molecular weight compatibilizing additives are given in U.S. Pat. No. 4,251,424, where sulphonamides and low molecular weight olefin/acid adducts are used to help compatibilize polyamide/modified polyethylene blends. In U.S. Pat. No. 4,283,459, aliphatic alcohols are used to help compatibilize PE/PP blends. Further examples of polymeric compatibilizers are given in Japanese patent No. J58007440-A and in Japanese patent No. J60020947 A, where gummy, random ethylene/propylene copolymers or polyolefin-modified liquid- rubbers, respectively, are used to help overcome the inherent incompatibility of polyethylene/polypropylene (PE/PP) blends.

The principal disadvantage of this technique is that it is rather ineffective. Usually such large amounts of compatibilizing bridge additives or copolymers must be used that the properties of the additive severely affect the property profile of the blend.

Still another approach has been to introduce functional groups into the component thermoplastic polymers by pre grafting or by copolymerization. By selecting complementary substituents for the polymer pair to be compatibilized so that the substituents have a strong interaction, up to and including the formation of chemical bonds, it is possible to obtain polymer blends with significantly improved mechanical properties. An example of this approach is given in U.S. Pat. No. 3,299,176, dated Jan. 17, 1967. In this case, two polyolefins are made compatible by introducing acidic groups in one of the olefin polymers and basic groups in the other polyolefin. A more recent example is described in International Application PCT/US84/02122 entitled "Polymer Blends Containing a Polymer Having Pendant Oxazoline Groups", filed Dec. 26, 1984. This patent application describes the use of pendant cyclic imino-ether groups in one polymer and the use of complementary functional groups (such as carboxyl, hydroxyl or amine, capable of reacting with the imino ether groups) in another polymer. In this case, a covalent bond is formed during compounding connecting the two component polymers and compatible blends with significantly improved properties can be made.

The principal disadvantage of the functional substituent approach is that it is costly. Since the component thermoplastic polymers must be modified by pre-grafting or even by copolymerization, these extra process steps can add substantially to the cost of the final blend. Further, one wishing to practice this technique must inventory specialty polymers solely for the purpose of preparing thermoplastic blends, since the modified polymers often would not be cost effective when used by themselves.

The general problem of poor mechanical properties in blends of preexisting hydrocarbon polymers is further aggravated when the blends contain fillers, which often lead to a sacrifice in important mechanical properties such as ductility and impact strength.

OBJECTS OF THE INVENTION

It is therefore an object of this invention to provide a process for producing blended mixtures of thermoplastic hydrocarbon polymers, which thermoplastic hydrocarbon polymers are normally incompatible with one another to varying degrees, without the need for polymer modifications before processing.

Another object of the invention is to provide such a process which does not require additional processing over and above what is needed in manufacturing filled compounds from a single thermoplastic polymer.

It is a further object of the invention to provide such a process which does not require the use of free radical initiators such as peroxides, which can make the production of a consistent product difficult and produce residual odors in the final products.

It is an additional object of the invention to produce flame retardant polyolefin blends which combine excellent mechanical properties, freedom from halogenated combustion products, and low raw material and process costs.

SUMMARY OF THE INVENTION

The present invention provides a novel method for preparing mineral-filled blended mixtures of incompatible hydrocarbon polymers. The resulting mineral-filled polymer mixtures have exceptional physical properties.

According to the method of the invention, (I) a first thermoplastic hydrocarbon polymer, and (II) a second thermoplstic hydrocarbon polymer incompatible with the first hydrocarbon polymer are mixed and compounded with (III) a compatibilizing system which comprises:
  (a) a mineral filler, and
  (b) from about 0.1 to 5.0 weight percent based on the weight of (I), (II) and (III) of a reinforcement additive selected from.the group consisting of:
    (i) a mixture comprising two interfacial agents, and
    (ii) a reinforcement promoter having at least two reactive olefinic double bonds.

The invention provides a process which allows the mixing of incompatible thermoplastic hydrocarbon polymers during conventional compounding, extrusion, and/or molding. This process provides a cost effective method of mixing incompatible thermoplastic hydrocarbon polymers.

The resulting mineral-filled mixtures of incompatible thermoplastic hydrocarbon polymers have physical and mechanical properties superior to those of mineral-filled compositions of either polymer alone or mineral-filled mixtures of the polymers without reinforcement additives. These compositions are readily extruded as tubing, such as pipe or conduit.

DETAILED DESCRIPTION OF THE INVENTION

Hydrocarbon Polymers

The term incompatible polymers as used herein refers to thermoplastic hydrocarbon polymers which when blended together form a composition which is a heterogenous blend and has poor mechanical properties.

A preferred group of thermoplastic hydrocarbon polymers which can be compatibilized according to this invention are the normally solid hydrocarbon polymers comprising the polyalkenes, such as the polymers and copolymers of ethylene, propylene, butene, hexene, neohexene and 4-methyl pentene. These polymers may further contain residual unsaturation enabling subsequent curing or cross-linking as can be achieved, for example, by co- or terpolymerization with diene monomers such as norbornadiene. Included in the hydrocarbon polymers are the homo- and copolymers of dienes such as polybutadiene and polyisoprene, as well as the copolymers of butadiene and isoprene with styrene. Other useful hydrocarbons are copolymers of the above with polar monomers such as vinyl acetate, ethyl acrylate, vinyl chloride, acr-ylamide and vinyl pyrollidone in an amount by volume up to 30 percent.

Specifically preferred are the commercially available, normally solid, grades of polyolefins, such as HDPE (high-density polyethylene), LLDPE (linear low density polyethylene) PP (polypro-pylene), homo- and copolymers including EPR and EPDM (ethylene/propylene rubbers), polyisoprene, butadiene and polybutadiene/styrene copolymers.

Filler

The mineral fillers that may be used in the compatibilizing system of the present invention are finely divided inorganic materials of natural or synthetic origin. The fillers may be particulates, platelets, fibers or fibrils, they maybe regular or irregular in shape, and they may be amorphous or crystalline.

Illustrative of the natural silicates is Kaolinite, also known as China Clay, which may be used either in a natural ("hydrous") form or in a dehydrated ("calcined") form. Examples of other common clay minerals are feldspar, nepheline, montmorillonite, bentonite and attapulgite. Other typical natural silicates are talc, mica, wollastonite and asbestos. Various synthetic silicates are commonly used as fillers in elastomers such as, for example, precipitated calcium and aluminum silicates. Special silicates such as the natural and synthetic zeolites are sometimes used in polymer bonded compositions where good mechanical properties are important for proper performance. Examples of expanded silicates are perlite and vermiculite. Illustrative of silica fillers are pyrogenic or fumed silica, precipitated or hydrated silica, vitreous or fused silica, and various natural silica fillers such as quartz, novaculite, tripoli and diatomite. Illustrative of carbonate mineral fillers are the natural calcite, dolomite, and limestone products (calcium and magnesium carbonates) which may be ground or provided in precipitated (synthetic) forms. Basic magnesium carbonate, commonly known as magnesium carbonate/hydrate is particularly useful. This is commonly described by the formula $xMgCO_3 \cdot yMg(OH)_2 \cdot zH_2O$, in which typically x is 3.2, y is 1 and z is 3.2, however the $Mg(OH)_2$ content usually ranges from 25–50% and the $MgCO_3$ content range from 1 to 15%. Illustrative of metal oxides and hydroxides are alumina, gibbsite, precipitated aluminum trihydrate, magnesium hydrate, manganese oxides, titanium dioxide, various iron oxides and hydroxides, zinc oxides and zirconium oxide. Illustrative of ceramic fillers are barium titanate, barium ferrite and neodynium titanate. Illustrative of sulphate fillers are baryte and gypsum. Other illustrative fillers are fibers made from glass, basalt and other molten glasses, such as furnace slag. The average particle size of the filler is usually up to 100 $\mu m$, and preferably less than 30 $\mu m$.

The preferred fillers are flame retardants such as aluminum trihydrate, magnesium hydrate and magnesium carbonate/hydrate.

Reinforcement Additives

The reinforcement additives can be reinforcement promoters or a mixture of interfacial agents as described in more detail below:

Interfacial Agents

The interfacial agents useful in the compatibilizing system are described in U.S. Pat. No. 4,409,32. These interfacial agents must satisfy certain criteria in order to provide reinforcement promotion in the compatibilizing system. These criteria are:

(1) The interfacial agents must be capable of copolymerizations with each other by addition or condensation polymerization reactions between chemically reactive groups;

(2) One of the interfacial agents is more highly adsorbable onto the filler surface while the other interfacial agent is more highly soluble in the filled polymers;

(3) One of the interfacial agents must contain at least one reactive olefinic double bond capable of mechanochemical grafting to at least one of the polymers during melt processing.

In cases where copolymerization between the interfacial agents are impossible, synergistic systems have not been found. In cases where copolymerization is possible, the extent of synergy can be determined from an empirical index, S, defined as follows:

$$S = 50(Q_A + Q_S - 0.2)(1 - 10R°_f)(0.5 - \Delta^2) \quad (A)$$

wherein $Q_A$ and $Q_S$ are the Alfrey-Price resonance parameters of the most reactive olefinic double bonds in the adsorbable and soluble agents, respectively; $R°_f$ is the relative flow ratio of the adsorbable agent measured by thin layer chromatography on a neutral silica gel using xylene as the eluant and di n-butyl fumarate as the standard; and $\Delta$ is the difference between the Hildebrand solubility parameters of the soluble agent and that of the polymer, respectively. The synergy index is a quant-itative statement of the criteria outlined qualitatively above. In Equation (A), the synergy index, S, has a value greater than 0, preferably greater than 2 and most preferably greater than 10.

In Equation (A), Q is commonly used for characterizing the resonance effect for monomers used in copolymerization. A detailed description of the Q concept is presented by T. Alfrey, Jr. and L. J. Young in Copolymerization at Chapter 2, pages 67 to 87, 1964, and in the references listed at the end of the chapter. An extensive tabulation of Q-values for monomers is given by L. J.

Young at pages II-387, II 404 in the second edition of Polymer Handbook, edited by J. Brandrup and E. H. Immergut, Interscience, New York, 1975. The agents in Equation (A) cannot in general be found in such tables; however, Q-values for interfacial agents may be estimated from the values of monomers having closely similar olefinic double bonds structures. Where the Q-values have not been tabulated for any closely similar structures, the values can be determined experimentally using the procedures set forth in the Brandrup and Immergut handbook and the references cited therein. The Q term in the equation- requires that at least one interfacial agent must contain olefinic double bonds having a sufficiently high Q-value to accomplish mechanochemical grafting to the hydrocarbon polymers during conventional compounding and processing operations. The Q term in Equation (A) reflects the finding that the sum of the Q values for the adsorbable interfacial agent, $Q_A$ and that for the soluble interfacial agent, $Q_S$ should be such that Q-values for all the reactive olefinic bonds should be greater than 0.2, and preferably each value $Q_A$ and $Q_S$ should be at least 0.1. The term "reactive" covers those olefinic double bonds which exhibit Q-values which satisfy Equation (A) to provide a positive synergy index.

The term "mechanochemical grafting" refers to mechanically induced chemical reactions principally cause by free radical formation due to rupture of polymer chains during melt processing. See for example, G. Kraus (editor), Reinforcement of Elastomers, New York, 1965 (Interscience).

The $R_f^s$ parameter in Equation (A) of the relative flow ratio, $R_f$, is a measure of the adsorptivity of an interfacial agent onto highly polar mineral surfaces. Many interactions between organic compounds and solid surfaces are highly specific, in that one mineral may result in chemical bonding wheraas another mineral may result in adsorption through dipole/dipole interactions. However, for the purpose of the present invention, the requirement of adsorptivity is for convenience expressed in terms of the relative flow ratio of the adsorbable agent measured by thin layer chromatography on a neutral silica gel using xylene as the eluant and di-n butyl fumarate as the standard. The silica gel is a convenient representation of a filler (silica) in a hydrocarbon polymer (xylene). Xylene is preferred over the simple aliphatic hydrocarbons because it is a better solvent for polar chemicals and the agents must be dissolved in order to perform the chromatographic adsorptivity test. The $R_f^s$ term assures that the interfacial agent molecule will adsorb sufficiently onto the filler surface so as to effectively contribute to the morphological change required in the polymer layer immediately adjacent to the filler particle. The relative flow ratio, $R_f^s$ which is used as the chromatographic adsorption parameter, is defined as the ratio of advancement of the dissolved agent relative to the advancement of the solvent front in a conventional thin layer chromatography test such that the greater the adsorptivity of the agent, the lower the flow ratio. The $R_f^s$ parameter used in Equation (A) is defined as the ratio of the flow ratio for the agent being tested, $R_f$, relative to the flow ratio of a standard compound $R_{fs}$, as follows:

$$R_f^s = R_f/R_{fs}$$

The chemical standard selected for purposes of the present invention is di-n-butyl fumarate. Background concerning chromatographic techniques and concepts is provided by L. R. Snyder, in Principles of Adsorption Chromatography, Marcel Dekker Inc., (New York), 1968. A specific discussion of thin layer plate techniques using particular material coatings on glass plates is presented by J. G. Kirchner, J. N. Miller, and G. J. Keller, in Analytical Chemistry, Volume 23, at pages 420-425, March 1951.

The $R_f^s$ term in Equation (A) requires that the adsorptivity of the interfacial agent must be apprecia-ble greater than that of di-n-butyl fumarate under the stated conditions. This is evident since, for S to remain positive, the relative flow ratio expression in Equation (A), (1-10 $R_f^s$), must be positive such that the algebraic requirement is for $R_f^s$ to be less than 0.1. The $R_f^s$ term in Equation (A) should, therefore, be as small as possible, preferably less than 0.05, and most preferably no more than 0 01. It is not critical, although often desirable, that the interfacial agent have a specific or chemical bonding interaction with the filler surface in a given filled polymer composition.

The $\Delta$ term in Equation (A) is the difference between the Hildebrand solubility parameters of the soluble agent, $\delta s$, and that of the major polymer component by volume, $\delta p$, in that:

$$\Delta = (\delta s - \delta p)$$

In the case where the polymers are of equal concentration by volume, that polymer for which $\Delta$ is smaller in the above calculation is defined to be the major polymer component. A list of $\delta p$ values, i.e., Hildebrand solubility parameters, for some typical hydrocarbon polymers is given in the following table:

TABLE A

| Hydrocarbon Polymer | Hildebrand Solubility Parameter $\delta p$ |
|---|---|
| Polybutadiene | 7.7 |
| Polyisobutylene | 8.2 |
| Polyisoprene | 8.3 |
| Polyethylene | 8.3 |
| Polypropylene | 9.0 |

In the case of copolymers, the Hildebrand solubility parameter is calculated using the "rule of mixtures" based on the mole-fractions of the various monomer constituents. The $\Delta$-term in Equation (A) requires that the soluble interfacial agent have a solubility parameter which is substantially similar to that of the particular hydrocarbon polymer.

The "adsorbable" agent in the mixture combination is the agent having the lowest $R_f^s$=value, i.e., the highest adsorptivity. The "soluble" agent in turn is generally the agent having the smallest $\Delta$, i.e., the solubility parameter closest to the polymer solubility parameter. In most cases of synergistic combinations, the most soluble agent will be the least adsorbable and vice versa. However, in cases where this is not the case, the agent with the lowest $R_f^s$-value is by definition the "adsorbable" agent and the other agent is by definition the "soluble" agent, no matter what the solubility parameter difference may be. The reason for this is that "soluble" in the context of this invention refers to the solubility of an interfacial agent in a filled rather than in an unfilled polymer. If a component is most strongly adsorbed onto the mineral filler surface, the concentration of that component in the matrix resin will be reduced due to the adsorption. These rules hence apply to the identification of the "adsorbable" and the "soluble" interfacial agent values to be inserted in the formula for the synergy index S.

It is to be understood that the synergy index, S, have a positive value only by having all the factors in Equation (A) being positive. Therefore, situations where S becomes positive by virtue of two of the factors being negative is not within the definition of a "positive synergy index". In other words, for the synergy index to be positive under the definition of the present invention, three conditions must be satisfied, in that each expression in Equation (A) must be individually satisfied as having a positive value.

A listing of the pertinent parameters for a representative selection of some interfacial agents is given in Table B below:

purpose of the present invention, such values are to be obtained from those listed or described in D. W. Krevelan, Properties of Polymers, Amsterdam/New York, 1976.

If an interfacial agent having excellent adsorptivity towards polar mineral surfaces but poor solubility in non-polar hydrocarbon media, such as heptane and polyethylene, e.g., 1,3,5 triacryloyl hexahydro-s-triazine (TAHT), is used in combination with an interfacial agent having only fair adsorptivity but good solubility in non-polar hydrocarbon media, e.g., trimethylolpropane triacrylate (TTA), a filled polymer composition is obtained which has far superior properties as compared to those compositions obtained using either interfacial agent alone.

Preferred interfacial agents include reinforcement

TABLE B

| Interfacial Agent | Designation | Olefinic bonds, n | Resonance, Q | Relative flow ratio, $R°_f$ | Solubility Parameter $\delta$ |
|---|---|---|---|---|---|
| Trimethylolpropane triacrylate | TTA | 3 | 0.4 | 0.12 | 8.9 |
| Triacryloyl hexahydro-s-triazine | TAHT | 3 | 1.3 | 0.01 | 10.4 |
| Stearic acid | STA | 0 | 0.0 | 0.6 | 8.2 |
| γ-tetramethacryloxypropyl silane | 4GMP | 4 | 0.7 | 0.07 | 8.0 |
| γ-trimethacryloxypropyl methoxy silane | 3GMPM | 3 | 0.7 | 0.08 | 8.2 |
| γ-dimethacryloxypropyl dimethoxy silane | 2GMP2M | 2 | 0.7 | 0.09 | 8.3 |
| γ-methacryloxypropyl trimethoxy silane | GMP3M | 1 | 0.7 | 0.10 | 8.6 |
| tetramethyl silicate | 4M | 0 | 0.0 | 0.00 | 9.3 |
| γ-trimethacryloxypropyl methoxy silane hydrolyzate | 3GMPM-H | 3 | 0.7 | 0.01 | 8.6 |
| γ-dimethacryloxypropyl dimethoxy silane hydrolyzate | 2GMP2M-H | 2 | 0.7 | 0.00 | 9.5 |
| γ-methacryloxypropyl trimethoxy silane hydrolyzate | GMP3M-H | 1 | 0.7 | 0.00 | 11.6 |
| tetramethyl silicate hydrolyzate | 4M-H | 0 | 0.0 | 0.00 | 18.8 |

For non-polar polymers, such as the various hydrocarbon polymers useful in the present invention, where specific interactions inherently are absent, the so called Hildebrand solubility parameter is an excellent measure of solubility or compatibility for added interfacial agents. The solubility parameter for polyethylene, for example, is about 8.3 and the closer to this value the solubility parameter for an interfacial agent is, the better the solubility in unfilled polyethylene. For a general discussion of the Hildebrand solubility parameter concept and the means for calculating it using the method of group contributions, which is particularly valuable for uncommon molecular structures such as those of many reinforcement promoters, see O. Olabisi et al., Polymer-Polymer Miscibility, Chapter 2.3, pages 47–63, New York, 1979, and the references cited therein. It is understood that solubility of an interfacial agent in a polymer for the purpose of this invention always refers to the molten or amorphous polymer. Hence, even though some of the hydrocarbon polymers useful in this invention are partially crystalline at room temperature, the amorphous densities must be used when calculating the solubility parameters. A group contribution for silicon of 32 cal.$^{\frac{1}{2}}$ cm$^{3/2}$/mole was calculated from a published value of the solubility parameter for polydimethylsiloxane of approximately 7.5 cal.$^{\frac{1}{2}}$ cm$^{-3/2}$, and from published group contribution values. This value for silicon was used in calculating the δ-values for silanes listed in Table B. Since there are some differences in numerical solubility parameters and group contributions among various authors, it is noted that for the promoters, which are described in more detail below.

The most preferred adsorbable interfacial agents are TAHT, MTA, ELA, TADAP and the hydrolyzed alkoxy silanes such as GMP3M-H, 2GMP2M H and 3GMPM-H.

The most preferred soluble interfacial agents are TTA and other di, tri- and polyhydroxylic acrylates and maleates and the unhydrolyzed alkoxy silanes such as 3GMPM, 2GMP2M, and GMP3M.

Silane coupling agents and related silicate esters are useful as interfacial agents. These typically include the free radical polymerizable, unsaturated, hydrolyzable silanes containing at least one silicon bonded hydrolyzable group, e.g., alkoxy, halogen, acyloxy, and the like, and at least one silicon-bonded organic radical containing at least one reactive olefinic double bond such as vinyl, gamma methacryloxypropyl, gamma-acryloxypropyl, and others. Any remaining valences of silicon not satisfied by a hydrolyzable group or a reactive olefinic double bond group being satisfied by a monovalent hydrocarbon group, such as methyl, ethyl, propyl, isopropyl, butyl, pentyl, isobutyl, isopentyl, octyl, decyl, cyclohexyl, cyclopentyl, benzyl, phenyl, phenylethyl, naphthyl, and the like. Suitable silanes of this type include those represented by the formula:

$$R_a SiX_b Y_c$$

wherein R is a monovalent hydrocarbon group; X is a silicon bonded hydrolyzable group; Y is a silicon-bonded monovalent organic group containing at least one reactive olefinic double bond; a is an integer of 0 to 2, preferably 0; b is an integer of 1 to 3; and c is an integer of 1 to 3; as well as the hydrolyzates of such silanes and/or the condensates of such hydrolyzates.

Examples of free radical polymer-izable unsaturated hydrolyzable silanes that can be used in this invention include:

γ-trimethacryloxypropyl methoxy silane (3GMPM)
γ-triacryloxypropyl methoxy silane (3GAPM)
γ-dimethacr-yloxypropyl dimethoxy silane (2GMP2M)
γ-diacryloxyypropyl dimethoxy silane (2GAP2M)
γ-methacryloxypropyl trimethoxy silane (GMP3M)
γ-acryloxypropyl trimethoxy silane (GAP3M)

Preferred silanes are those for which the Q-value of at least one of the olefinic double bonds is greater than 0.2, pr-eferably greater than 0.4. However, for special purposes, silanes containing no olefinic double bonds may be included in certain synergistic combinations because of the copolymerization mechanism of condensation inherent in alkoxy silanes. Examples of such silanes are:

γ-aminopropyl triethoxy silane
γ-mercaptropropyl trimethoxy silane
γ-glycidoxypropyl trimethoxy silane Silane coupling agents are currently used, for example, in treating fiberglass and the like. Under the present invention, by combining adsorbable and soluble interfacial agents, based on the solubility data and adsorptivity data from Table B, it becomes evident that alkyl silicates combined with tri-, di or mono alkoxysilane (in order of increasing effectiveness) provide superior reinforcement promotion than is provided by the single component tri-alkoxy silanes. Similarly, superior performance can be obtained from combining a neat silane with mono-, di or tri-alkoxy silanes (in order of increasing effectiveness). The best silane/organic combinations of interfacial agents are those of a more highly adsorbable silane, such as a hydrolyzed tri-alkoxy silane, with a soluble organic reinforcement promoter, such as TTA. The more polyolefin-compatible silanes, in contrast, will show the highest levels of synergy when combined with the highly polar and firmly adsorbed reinforcement promoters, such as TAHT, MTA, ELA and TADAP.

The proportions of reinforcement additives will vary depending upon the combination of interfacial agents in different ratios depending upon the synergistic benefits of having one agent in proportionately greater amounts than the other. A preferred ratio range is from 1:10 to 10:1, preferably 1:4 to 4:1.

Reinforcement Promoter

The reinforcement promoters useful in the compatibilizing system are those designated in U.S. Pat. No. Re 31,992, entitled "Reinforcement Promoters for Filled Thermoplastic Polymers".

These reinforcement promoters are chemicals which have at least two reactive olefinic double bonds and which are further characterized by having a positive promoter index value, P, which is defined by the following equation:

$$P = n(n-1)Q(e+2)(1-2R_f) - 2.5 \quad \text{(B)}$$

where n is the number of olefinic bonds in the promoter, Q and e are the Alfrey-Price parameters with regards to the resonance and polarity, respectively, for at least one of the olefinic double bonds in the promoter, and $R_f$ is the flow rate ratio of the promoter measured by thin layer chromatography on a neutral silica gel using xylene as the eluant and di-n butyl fumarate as the standard. In Equation (B), the promoter index, P, has a value greater than zero, preferably greater than 2.0 and most preferably greater than 10. The promoter index formula illustrates the complex relation between the four critical parameters which contribute to the exceptional performance of the class of reinforcing promoters utilized in the present invention.

Of the four parameters in Equation (B) which determine the promoter index, n is the number of reactive olefinic double bonds in the structure of the reinforcing promoter. The term "reactive" covers those double bonds which exhibit Q and e-values which satisfy Equation (B) to provide a positive reinforcement promotion index. It is preferred that n be at least three although in special cases where the other parameters are particularly favorable, n may be as low as two. Equation (B) reflects the finding, with all other factors being equal, that the reinforcement performance varies strongly with n, when n is at least two. The form of the n-term reflects the importance of localized network, i.e., bound polymer, formation near the surface of the filler particle as is discussed in the mechanism section below.

The next two parameters in Equation (B), Q and e, are commonly used for characterizing the resonance and the polarity effects, respectively, for monomers used in copolymerization. A detailed description of the Q and e concepts is presented by T. Alfrey, Jr. and L. J. Young in Copolymerization at Chapter 2, pages 67 to 87, 1964, and in the references listed at the end of the chapter. At extensive tabulation of Q and e values for monomers is given by L.J. Young at pages II 387 to II 404 in the second edition of Polymer Handbook, edited by J. Brandrup and E.H. Immergut, Interscience, (New York) 1975. The promoters defined by Equation (B) cannot in general be found in such tables, however, Q and e-values for potential reinforcement promoters may be estimated from the values of monomers having closely similar olefinic double bond structures. Where the Q and e values have not been tabulated for any closely similar structures, the values can be determined experimentally using the procedures set forth in the Brandrup and Immergut handbook and the references cited therein. The Q and e terms in Equation (B) reflect the finding that Q values should preferably be high, most preferably greater than or equal to 0.4, and that, in general, positive e values are preferred, and most preferably have a value of at least 1.0.

The final parameter in Equation (B) of the relative flow ratio, $R_f$, is a measure of the adsorptivity of a potential reinforcement promoter onto highly polar mineral surfaces. Many interactions between organic chemicals and solid surfaces are highly specific, in that one mineral may result in chemical bonding whereas another mineral may result in adsorption through dipole/dipole interactions. However, for the purpose of the present invention, the requirement of adsorptivity is for convenience expressed in terms of the relative flow ratio of the promoter measured by thin layer chromatography on a neutral silica gel using xylene as the eluant and di-n-butyl fumarate as the standard. The silica gel is a convenient representation of a filler (silica) in a hydrocarbon polymer (xylene). Xylene is preferred over the simple aliphatic hydrocarbons because it is a better solvent for polar compounds and the compounds must be dissolved in order to perform the chromatographic adsorptivity test. The $R_f°$ term assures that the critical parameters for various chemicals which satisfy Equation (B).

TABLE C

| Chemical | Designation | Carbon-carbon double bonds n | Resonance, Q | Polarity, e | Relative flow ratio, $R°_f$ | Promoter Index, P |
|---|---|---|---|---|---|---|
| Trimethylolpropane triacrylate | TTA | 3 | 0.4 | 1.0 | 0.12 | 3.0 |
| Pentaerythritol triacrylate | PETA | 3 | 0.4 | 1.0 | 0.05 | 4.0 |
| Polycaprolactone triacrylate | PCLTA | 3 | 0.4 | 1.0 | 0.01 | 4.6 |
| m-Phenylene bis maleimide | PBM | 2 | 3.0 | 1.6 | 0.06 | 16.5 |
| Dipentaerythritol pentaacrylate | DPEPA | 5 | 0.4 | 1.0 | 0.04 | 19.6 |
| Melamine triacrylate | MTA | 3 | 1.3 | 1.2 | 0.02 | 21.5 |
| Epoxidized linseed oil/acrylate | ELA | 5 | 0.4 | 1.0 | 0.01 | 21.0 |
| Triacryloyl hexahydro-s-triazine | TAHT | 3 | 1.3 | 1.2 | 0.01 | 22.0 |
| Maleamic acid derivatives of methylene-aniline oligomers* | MADMA | 3 | 1.2 | 1.5 | 0.01 | 22.2 |
| Trimethylolpropane trimaleate | TTM | 3 | 1.2 | 1.5 | 0.01 | 22.2 |
| Trimethacryloyl hexahydro-s-triazine | TMHT | 3 | 1.5 | 1.2 | 0.01 | 25.7 |
| N,N—Tetraacryloyl 1,6-diaminopyridine | TADAP | 4 | 1.3 | 1.2 | 0.01 | 46.4 |

*Methylene-aniline oligomers fall under the trade name "Jeffamine" as produced by the Jefferson Chemical Company potential reinforcement promoter molecule will adsorb sufficiently onto the filler surface so as to effectively contribute to the mor-phological change required in the polymer layer immediately adjacent to the filler particle. The relative flow ratio, $R_f°$, which is used as the chromatographic adsorption parameter, is defined as the ratio of advancement of the dissolved chemical relative to the advancement of the solvent front in a conventional thin-layer chromatography test such that the greater the adsorptivity of the chemical, the lower the flow ratio. The $R°_f$ parameter used in Equation (B) is defined as the ratio of the flow ratio for the chemical being tested, $R_f$, relative to the flow ratio of a standard compound, $R_{fs}$ as follows:

$$R_f° = (R_f/R_{fs})$$

The standard selected for purposes of the present invention is di-n-butyl fumarate. Background concerning chromatographic techniques and concepts is provided by L. R. Snyder, in Principles of Adsorption Chromatography, Marcel Dekker Inc., ( New York), 1968. A specific discussion of thin layer plate techniques using particulate material coatings on glass plates is presented by J. G. Kirchner, J. N. Miller, and G. J. Keller, in Analytical Chemistry, Volume 23, at pages 420–425, March 1951.

The $R_f°$ terms in Equation (B) requires that the adsorptivity of an effective reinforcement promoter must be appreciably greater than that of di-n-butyl fumarate under the stated conditions. This is evident since for P to remain positive the algebraic requirement is for $R_f°$ to be less than 0.5. The $R_f°$ term in Equation (B) should therefore be as small as possible, preferably less than 0.05, and most preferably no more than 0.01. It is not critical, although often desirable, that a reinforcement promoter have a specific or chemical bonding interaction with the filler surface in a given filled polymer composition.

Equation (B) is a statement of the findings that the four critical parameters of n, Q, e and $R_f°$ must simultaneously be within certain ranges of values, and that some relaxation in the requirement for one or more parameters is allowable only if one or more of the other parameters assume particularly favorable values. The following table (Table C) gives the vllues for the four critical parameters for various chemicals which satisfy Equation (B).

In some instances it is possible or even preferable to carry out the synthesi-.s of certain reinforcement promotrs directly on a filler surface. It is therefore within the spirit and intent of the present invention that the definition of reinforcement promoters applies to those chemicals as they actually occur on the filler surfaces, even though the individual reagents may not satisfy the requirements under Equation (B).

Preferred reinforcement promoters include those chemicals having the following structure:

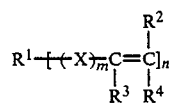

wherein $R^1$ is an organic group free of olefinic or acetylenic unsaturation having a valence of n; $R^2$; $R^3$ and $R^4$ are hydrogen, carboxy or monovalent organic groups free of olefinic or acetylenic unsaturation; X is:

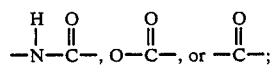

m has a value of 0 or 1; and n has a value of at least two, and preferably from 3 to 5. When m is zero, $R^1$ preferably has a double or triple bond which is conjugated with the olefinic double bond, and which is electron withdrawing. When m is one, X preferably has a similar conjugated double bond structure providing an electron withdrawing effect on the olefinic double bond. Illustrative of the roup represented by $R^1$ are heterocyclic groups consisting of carbon, hydrogen and nitrogen, e.g., s-triazine and diaminopyridine where the free valences are on nitrogen; polyvalent hydrocarbon groups, such as alkylene, phenylene, or a group derived from polyhydroxy alkanes by the removal of the hydroxyl groups such as contained in the condensation products of acrylic and maleamic acids with aliphatic, aromatic or heterocyclic polyols; or acrylamides, maleimides and maleamic acids of aliphatic, aromatic and heterocyclic polyamines. Particularly preferred reinforcement promoters are those chemicals listed in Table D below:

TABLE D

| Designation | m | n | R$^1$ | R$^2$ | R$^3$ | R$^4$ | X |
|---|---|---|---|---|---|---|---|
| TTA | 1 | 3 | CH$_3$CH$_2$Cl(CH$_2$)$_{\overline{5}}$ | H | H | H | $-O-\overset{O}{\underset{\parallel}{C}}-$ |
| PETA | 1 | 3 | $-$(CH$_2$)$_3$C=CH$_2$OH | H | H | H | $-O-\overset{O}{\underset{\parallel}{C}}-$ |
| DPEPA | 1 | 5 | HO—CH$_2$—C(CH$_2$)(CH$_2$)—CH$_2$—O—CH$_2$—C(CH$_2$)(CH$_2$)—CH$_2$— | H | H | H | $-O-\overset{O}{\underset{\parallel}{C}}-$ |
| MTA | 1 | 3 | triazine with $-$HN, NH$-$, NH substituents | H | H | H | $-O-\overset{O}{\underset{\parallel}{C}}-$ |
| TANT | 1 | 3 | triazinane with $-$N, N$-$, N | H | H | H | $-\overset{O}{\underset{\parallel}{C}}-$ |
| MADMA | 1 | 2 + a | $\left(\text{C}_6\text{H}_4\right)-\text{CH}_2-\left[\left(\text{C}_6\text{H}_4\right)-\text{CH}_2-\right]_2\left(\text{C}_6\text{H}_4\right)$ | H | H | COOH | $-\overset{H}{\underset{\mid}{N}}-\overset{O}{\underset{\parallel}{C}}-$ |
| TTM | 1 | 3 | CH$_3$CH$_2$C(CH$_2$)$_{\overline{5}}$ | H | H | COOH | $-O-\overset{O}{\underset{\parallel}{C}}-$ |
| TMHT | 1 | 3 | triazinane with $-$N, N$-$, N | CH$_3$ | H | H | $-\overset{O}{\underset{\parallel}{C}}-$ |
| TADAP | 1 | 4 | m-phenylene with $-$N, N$-$, N | H | H | H | $-\overset{O}{\underset{\parallel}{C}}-$ |

The following percentages are by weight based on the total weight of composition including the hydrocarbon polymers and the compatibilizing system, which comprises the filler and reinforcing additives.

The amount of reinforcement additives is usually from about 0.1 to 5.0 weight percent, -preferably about 0.5 to 2.0 weight percent. The amount of filler is from about 10 to 90 weight percent, preferably 10 to 60 weight percent. The amount of the two incompatible hydrocarbon polymers is about 10 to 90 weight percent, preferably about 40 to 90 weight percent based on the total weight of the hydrocarbon polymers and compatibilizing system.

The relative proportions of the two incompatible hydrocarbon polymers can be varied widely. Usually the weight:weight ratio of the first polymer to the second polymer will range from 1:20 to 20:1. Preferably the ratio will range from 1:10 to 10:1.

Adjuvants

Other adjuvants which may be employed in the compositions of the present invention include curing agents; flame retardant additives; blowing agents; nucleating agents for blown systems; lubricants; UV stabilizers;

dyes and colorants; voltage stabilizers; metal deactivators; and traditional coupling agents. These adjuvants would be used in amounts designed to provide the intended effect in the resulting composition. The total amount of adjuvants would usually range from 0 to about 20 weight percent based on the total weight of the composition.

The melt compounding and processing should be conducted in the substantial absence of free radical initiators or their residue to the extent that the presence of such chemicals would interfere with the compatibilizing system. In quantitative terms, generally less than 0.1 weight percent of free radical initiator or its residue with respect to the weight amount of reinforcement additive should be present, and preferably no more than 0.05 weight percent.

Where the adjuvants are compounds which may interfere with the performance of the reinforcement additives they should be added subsequent to the formation of the filled, compatibilized thermoplastic composition. If there is no significant interaction to inhibit the performance of the reinforcement additives, the adjuvants may be added at any time based on the established procedures of the prior art.

Surfactants

Surfactants that are useful in the present invention include polysiloxanes containing per molecule at least one silicon bonded alkyl group of at least 12 carbon atoms, as generally represented by the average formula:

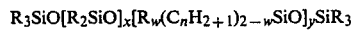

$$R_3SiO[R_2SiO]_x[R_w(C_nH_{2n+1})_{2-w}SiO]_ySiR_3$$

wherein R is monovalent hydrocarbon of 1 to 12 carbon atoms, preferably methyl, n is an integer of at least 12 and preferably not more than 24, w is an integer of 0 or 1, preferably 1, x is an integer of at least 1, preferably 10 or more, and y is an integer of 1 or more, preferably at least 10. R, w and n can be the same or different throughout each molecule.

Additional surfactants useful in this invention are the polyoxyalkylene compounds having one or more polyoxyalkylene blocks each bonded at one end to a siloxane block, an alkyl group having at least 12 carbon atoms, or an alkenyl group, and bonded at the other end to an alkoxy group, an acetoxy group, a siloxane block or a hydroxy group. These surfactants include the "hydrolyzable" polysiloxane polyoxyalkylene block copolymers such as the block copolymers described in U.S. Pat. Nos. 2,834,748 and 2,917,480 and the "non hydrolyzable" polysiloxane polyoxyalkylene block copolymers such as the block copolymers described in U.S. Pat. Nos. 3,505,377 and 3,686,254, and British Patent No. 1,220,471. These various polysiloxane-polyoxyalkylene block copolymers preferably contain from 5 to 50 weight percent of polysiloxane polymer with the remainder being polyoxyalkylene polymer.

A preferred class of polysiloxane polyoxyalkylene block copolymers are those represented by the average formula:

$$R_3SiO[R_2SiO]_s[R'SiO]_tSiR_3$$
$$|$$
$$(C_mH_{2m}O)_pR'$$

wherein R' is a monovalent hydrocarbon group having 1 to 18 carbon atoms or an alkanoyl group having 1 to 18 carbon atoms, R is as defined above, s is an integer of 1 or more, preferably 1 to 100, t is an integer of 1 or more, preferably 1 to 100, m is an integer of 2 or more, preferably 2 or 3, p is an integer of 2 or more, preferably 2 to 40, and R, R', m, and p may be the same or different throughout the same molecule.

Additional polyoxyalkylene surfactants useful in this invention can be represented by the average formula:

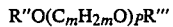

$$R''O(C_mH_{2m}O)_pR'''$$

wherein R'' is an alkyl group of at least 12 carbon atoms, preferably 12 to 18 carbon atoms or an alkenyl group having 2 or more carbon atoms, preferably 3 to 18 carbon atoms, such as, alkyl, R''' is hydrogen, alkyl having 1 to 18 carbon atoms or alkanoyl having 1 to 18 carbon atoms, and m and p are as defined above and can the the same or different throughout the same molecule.

Useful surfactants also can include polyoxyalkylene polyols of a wide range of molecular weights such as polyoxyethylene glycol, polyoxypropylene glycol, or polyoxyethylenepolyoxypropylene glycol in which the ethyleneoxy groups and propyleneoxy groups are randomly distributed in the molecular chain or in which blocks of two or more ethyleneoxy groups are connected to blocks of propyleneoxy groups. Liquid surfactants are preferred over solid surfactants.

The polysiloxane-polyoxyalkylene block polymer surfactants are preferred. The polyoxyalkylene chains or blocks can comprise all the alkyleneoxy units or all propyleneoxy units or units of both randomly dispersed throughout the block or assembled into sub-blocks of propyleneoxy units. Preferred polysiloxane-polyoxyalkylene block copolymers are those having the higher molecular weight polysiloxane blocks.

In the polysiloxane surfactants including the polysiloxane-polyoxyalkylene block copolymer surfactants suitable for use in this invention, any valences of silicon not satisfied by a divalent oxygen of $\equiv$SiOSi$\equiv$ linkage or by a polyoxyalkyleneblock through a $\equiv$SiC$\equiv$ or $\equiv$SiOC$\equiv$ linkage is satisfied by monovalent hydrocarbon group having at least one carbon atoms and preferably 1 to 18 carbon atoms. Thus, the surfactants are not limited to any molecular confiquration and can be linear, branched, cyclic, etc.

A particularly preferred surfactant is the compound represented by the formula:

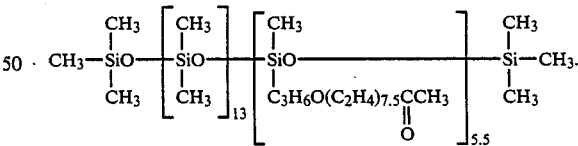

Process

In an embodiment of the process of the present invention, the reinforcement additives can be applied using an organic solvent directly onto the filler prior to compounding with the polymers. This is done to avoid possible spurious effects caused by the often significant differences in the physical characteristics, such as melting points, boiling points, viscosities, and the like, among the various reinforcement additives. Nevertheless, in actual practice other means of incorporating the reinforcement additives are often preferable, both from a manufacturing and from a cost viewpoint. For example, the reinforcement additives may be incorporated directly into the filler polymer mixture at the time of compounding, i.e., integral blending. They may be incorporated by emulsifying or dispersing the reinforcement additives in water, and then applying as a pretreatment to the filler; or by any other procedure established in the art depending on the nature of the reinforcement additive.

When the reinforcement additive is the mixture of interfacial agents, one particularly attractive process will often be to pretreat the filler with the adsorptive interfacial agent and to incorporate the soluble interfacial agent into the polymers. This will enable the synergistic interaction to take place under the most favorable conditions during subsequent compounding. The interfacial agents may be incorporated by dissolving, emulsifying or dispersing one interfacial agent of the mixture in the other interfacial agent rather than in a solvent.

MECHANISM

The dramatic effect of the compatibilizing system in achieving valuable property profiles in blends of filled mixtures of incompatible thermoplastics disclosed herein are believed to occur due to simultaneous grafting of molecules from each polymer onto the filler surfaces by means of the reinforcement additives, thereby impeding phase separation of the polymers. Also, since reinforcement additives are strongly adsorbed to the filler surfaces, these grafting and cross linking reactions are concentrated in the polymer layers close to the filler surface. This is precisely the micro regions where stress concentrations are highest and where improvements in mechanical properties therefore are most effective. At the same time, since the reinforcement additive concentrations further into the bulk of the polymers are much lower than in the filler/resin boundary layer, the melt rheology or flow properties of the compositions produced are relatively unimpaired, which is a great advantage in maintaining good processability (extrudability and moldability) of the filled compound.

The above hypothesis is presented in an effort to explain the chemical and physical phenomena described in this disclosure. However, the inventors do not wish to be bound by this or any other mechanism expressed herein and the explanations are not intended to limit the scope of this invention as it is otherwise defined.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

EXAMPLES

The following examples illustrate the effectiveness of the reinforcement additives used in the invention in improving the properties of mineral filled mixtures of incompatible thermoplastic hydrocarbon polymers. Specifically, the experimental data show that it is possible to formulate filled thermoplastic with dramatically superior property profiles as compared to these filled blends without the reinforcement additives.

Experimental Procedure

Unless otherwise indicated, the procedure for making the treated, filled blends of incompatible hydrocarbon polymers compositions was as follows:

The filler was pretreated by first dissolving the reinforcement additive in enough solvent, e.g., acetone, to dissolve the additive, but less than the amount of solvent which would produce a paste with the wetted filler. The solution was then added to the filler, blended mechanically and air dried overnight. In the case of the controls an equivalent amount of solvent was used without the additive.

The pretreated filler was compounded with the hydrocarbon polymers on a 6" by 12" 2-roll mill at 180° C. by adding pretreated filler incrementally to the fluxed polymers. Mixing was continued using thorough compounding procedures. A sheet of the treated, filled polymer was then cut and rolled into a cylindrical bar, i.e., "pig", and then passed end wise through the compounding mill about ten times for a total mixing time of ten minutes after all the filler had been added. The product composition was then sheeted off the mill, allowed to cool to room temperature and granulated in a granulator.

The granulated product composition was injection molded at a melt temperature of 215° C. using a 38 cm$^3$ capacity, 30 ton reciprocating screw-injection machine with a mold providing as ASTM dog bone test bar with dimensions of 2" by ⅛" by ⅛" for testing tensile properties, and a rectangular bar with dimensions 5" by ⅛" by ⅛" for testing flexural properties. The following tests were used:

| Property Tested | ASTM Test Designation |
|---|---|
| Tensile Strength (TS) | |
| Tensile Modulus (TM) | |
| Elongation at Yield (EY) | D638-76 |
| Elongation at Break (EB) | |
| Flexural Strength (FS) | D790-71 |
| Flexural Modulus (FM) | |
| Izod Impact Strength | D256-73 |
| Heat Distortion Temperature | D648-72 |

During the tension and flexural tests a cross-hed speed of 0.2" per minute was utilized. The extruded pipe and conduit were tested according to Underwriers Labroatories Standards for Electrical Conduit (UL651).

The chemical designations used in the examples are defined as follows:

| Designation | Description |
|---|---|
| ATH I | Aluminum Trihydrate, sold as RH-730 by Reynolds |
| ATH II | Aluminum Trihydrate, sold as Hydral ™ 710B, by Alcoa |
| EDMS | Ethoxylated Poly(Dimethyl Siloxane) |

$$CH_3-\underset{\underset{CH_3}{|}}{\overset{\overset{CH_3}{|}}{Si}}O-\left[\underset{\underset{CH_3}{|}}{\overset{\overset{CH_3}{|}}{Si}}O\right]_{13}-\left[\underset{\underset{C_3H_6O(C_2H_4)_{7.5}CCH_3}{|}}{\overset{\overset{CH_3}{|}}{Si}}O\right]_{5.5}-\underset{\underset{CH_3}{|}}{\overset{\overset{CH_3}{|}}{Si}}-CH_3$$
$$\underset{O}{\underset{\|}{}}$$

| | |
|---|---|
| GMP3M | γ-methacryloxypropyl trimethoxy silane |
| HDPE II | High Density Polyethylene, sold as |

-continued

| Designation | Description |
|---|---|
| | DGW-819 by Union Carbide |
| HDPE III | High Density Polyethylene, sold as HMN 5502 by Phillips |
| LLDPE | Linear Low Density Polyethylene, sold as Tuflin 6078 (.918 density/2.0 MI) by Union Carbide |
| MGH I | Magnesium Hydrate, sold as Kisuma 5 by Kyowa Chemical, Japan |
| MGH II | Magnesium Hydrate, sold as Kisuma 5B by Kyowa Chemical, Japan |
| PP II | Polypropylene homopolymer, sold as Profax TM 6601 by Hercules/Himont |
| PP III | Polypropylene homopolymer, sold as Profax TM 7801 by Hercules/Himont |
| PP IV | Polypropylene homopolymer, sold as Profax TM 6801 by Hercules/Himont |

EXAMPLE I

This example shows that when TTA is used as a reinforcement promoter and the incompatible polymers are high density polyethylene (HDPE) and polypropylene (PP) filled with aluminum trihydrate (ATH) the resulting composition (sample 1) has greatly improved properties when compared to the filled blend of HDPE and PP without the reinforcement promoter (control 1).

The following polyolefin blends were compounded on a two roll mill and injection molded as described in the general section above:

TABLE IA

| | (Grams) | |
|---|---|---|
| | Sample 1 | Control 1 |
| HDPE II | 150 | 150 |
| PP II | 150 | 150 |
| ATH I (Filler) | 300 | 300 |
| Ionox 330 | 0.75 | 0.75 |
| TTA | 6 | — |

The injection molded samples were then tested with the following results:

TABLE IB

| | Sample 1 | Control 1 |
|---|---|---|
| Tensile Strength, psi | 3,630 | 3,130 |
| Tensile Modulus, ksi | 254 | 276 |
| Flexural Strength, psi | 5,940 | 5,260 |
| Flexural Modulus, ksi | 365 | 356 |
| Notched Izod, ft.lbs/in | 2.8 | 1.8 |
| Heat Distortion Temp.,°C. | 63 | 67 |
| Flex Resistance (180° Bending) | No Break after >100 cycles | Break after one cycle |

The most desirable property profile for the molded product is a combination of good toughness with high strength and stiffness. The data in Table I B show that the reinforcement promoter TTA increases the notched Izod impact strength by over 50% while at the same time improving strength and maintaining modulus (stiffness). The effect of TTA on resistance to breakage in flexure is dramatic and the resistance to flexural fatigue shown by Sample 1 is outstanding for a highly filled polyolefin blend. The production of a blend having such dramatically improved properties demonstrates that the polymers were compatibilized.

EXAMPLE II

This example demonstrates that reinforcement promoter TTA improves the moisture resistance of an ATH-filled HDPE/PP blend.

Injection molded samples from Example 1 were submerged in boiling water for 24 hrs, quickly dried and tested for physical properties with the following results:

TABLE II

| | Sample 1 | | Control 1 | |
|---|---|---|---|---|
| | dry | wet | dry | wet |
| Tensile Strength, psi | 3,630 | 3,030 | 3,130 | 2,550 |
| Tensile Modulus, ksi | 254 | 190 | 276 | 161 |
| Notched Izod, ft. lbs/in | 2.8 | 3.5 | 1.8 | 6.5 |

The data Table in II show that the control sample gains a large increase in impact strength after water exposure. Although this by itself is beneficial, it is gained at a significant sacrifice in strength and stiffness which shows that the interface is being decoupled by the water exposure. In comparison, the TTA treated composition (sample 1), shows much smaller changes between wet and dry properties proving that TTA makes the ATH filled HDPE/PP blend more resistant to moisture.

EXAMPLE III

This example shows that ((TTA+GMP3M-)+EDMS), a mixture of interfacial agents, and a surfactant mixed in weight ratio of 1:1:0.75 markedly increases the uctility and impact strength of HDPE/PP compositions which are highly filled with ATH, while maintaining or increasing the strength and stiffness over a broad range of HDPE/PP ratios.

The following formulations were prepared as described in EXAMPLE I except that 1 percent by weight of synergistic mixture based on the weight of the filler was used. A parallel series of controls without the interfacial agents were prepared in the same manner.

TABLE IIIA

| | (Grams) | | | | | | | |
|---|---|---|---|---|---|---|---|---|
| | S3-0 | C3-0 | S3-1 | C3-1 | S3-2 | C3-2 | S3-3 | C3-3 |
| PP IV | 300 | 300 | 225 | 225 | 150 | 150 | 75 | 75 |
| HDPE II | — | — | 75 | 75 | 150 | 150 | 225 | 225 |
| ATH II | 300 | 300 | 300 | 300 | 300 | 300 | 300 | 300 |
| TTA/GMP3M/EDMS | 3 | — | 3 | — | 3 | — | 3 | — |

The injection molded test specimens were tested with the following results:

TABLE IIIB

| | S3-0 | C3-0 | S3-1 | C3-1 | S3-2 | C3-2 | S3-3 | C3-3 |
|---|---|---|---|---|---|---|---|---|
| TS, psi | 3,600 | 2,900 | 3,300 | 3,300 | 3,200 | 2,900 | 4,200 | 2,400 |
| TM, ksi | 341 | 318 | 310 | 306 | 288 | 269 | 281 | 234 |
| EB, % | 2.5 | 1.6 | 7.0 | 1.5 | 28 | 2.3 | 19 | 9.8 |
| FS, psi | 7,600 | 6,500 | 7,200 | 6,300 | 7,400 | 6,100 | 7,300 | 6,000 |
| FM, ksi | 535 | 519 | 521 | 486 | 497 | 439 | 473 | 403 |
| Notch Izod | 0.5 | 0.2 | 1.1 | 0.3 | 1.9 | 0.5 | 3.1 | 1.5 |
| Flex Resist* | 5 | 1 | 10 | 1 | 10 | 1 | 8 | 1 |

*Rating: 1 Very Poor to 10 Excellent

The property profiles of the PP/HDPE blend formulations prepared with the mixture of interfacial agents and surfactant (S3-1 through S3-3) are vastly superior to that of S3-0 (PP alone) and to those of all the control formulations of blends of HDPE/PP C3-1 through C3-3 and C3-0 (PP alone).

These data illustrate dramatically how a compatabilizing system when applied to a blend of thermoplastics can overcome compatibility deficiencies of the polymer blend, and transform what otherwise would be a brittle and weak material (C3-0) into a range of highly useful ductile, tough and strong new materials (S3-1 through S3-3).

EXAMPLE IV

This example shows the effect of the (TTA/GMP3-M/EDMS) a mixture of interfacial agents and surfactant as described in EXAMPLE III on ATH-filled blends of HDPE and LLDPE.

Forty pounds of the following formulations were compounded in a size 1 laboratory Banbury:

TABLE IVA

| | (Weight Percent) | |
|---|---|---|
| | Sample 4 | Control 4 |
| HDPE III | 30 | 30 |
| LLDPE | 15 | 15 |
| ATH II | 54 | 54 |
| TTA/GMP3M/EDMS | 1 | — |

The Banbury was charged in two stages: First, one half of the resins and fillers were added, then the reinforcement promoter, next the other half of the resins and filler: this procedure helps to prevent loss of the reinforcement promoter, which is a liquid. The Banbury was operated in "neutral", i.e., without applying cooling or heating. Mixing was done at medium to high rotor speeds with a ram pressure of 70 psi. After the compound was fluxed, mixing was continued for another five minutes. Cooling water was then applied to the rotors to facilitate discharge and the compound was next sheeted off a 16×24 inch two roll mill operating at 100° F. After cooling, the sheet was granulated and injection molded on an Arburg model 221-55-250 1.19 oz. machine at the following conditions:
Barrel: 400°–410° F.
Nozzle: 410° F.
Mold: 200° F.
Injection Pressures:
  850 inch ASTM tensile bars)
  550 psi (for 5 inch Izod bars)
Cycle Times, seconds:
  15 sec. Injection
  6 sec. Holding
  45 sec. Cooling
The samples were then tested with the following results:

TABLE IVB

| | Sample 4 | Control 4 |
|---|---|---|
| Tensile Strength, psi | 4,150 | 2,050 |
| Elongation @ Break, % | 19 | 3.6 |
| Flexural Modulus, ksi | 249 | N/A |
| Notched Izod, ft. lbs/in | >25 | 8.7 |

The data of Table IV B that this mixture of interfacial agents plus a surfactant are very effective in producing HDPE/LLDPE blends having good mechanical properties. The simultaneous improvements of greater than 100% in ductility, impact and tensile strength are dramatic.

EXAMPLE V

This example illustrates the improvements in processability provided by the mixture of interfacial agents and surfactant used in EXAMPLE IV. The formulations marked "Sample 4" and "Control 4" in TABLE IV A were used during extrusion trials of 2 inch diameter schedule 40 pipe. The following extrusion equipment was used:
Barrel diameter: 2.25 inches
Screw L/D ratio: 24:1
Screw Configuration:*
Feed Section: 6 diameters 0.48 in deep
Barrier Section:**
  10.1 diameters
  0.48–0.04 in (S) 0.15–0.30 in (M)
Transition Section:**
  1.4 diameters
  0.040–0.025 in (S) 0.030–0.190 in (M)
Metering Section: 6.5 diameters 0.190 inches
* Maillefer type mixing screw design
** Dual flight sections, S=Solids Channel, M=Melt Channel
The extruder operating conditions were as follows:

| Barrel Temperatures: | |
|---|---|
| Zone 1 (Feed): | 390° F. |
| Zone 2: | 375° F. |
| Zone 3: | 300° F. |
| Zone 4 (Front): | 280° F. |
| Die Temperatures: | 320° F. |
| Melt Temperature: | 374° F. |
| Head Pressure: | 3140 psi |
| Screw RPM: | 40 |
| Output Rate: | 150 lbs/hr |

The sample 4 formulation ran very well and resulted in smooth-walled pipe without flaws. The control 4 formulation without the interfacial agents and surfactant could not be extruded into satisfactory pipe.

The extruded pipe made from the composition designated sample 4 was tested according to UL 651 with the following results:
Flammability: Self Extinguishing
Crush Resistance: 345 lbs @30% deflection
Impact Resistance: 20 ft.lbs
As can be seen, this pipe is strong and flame retardant.

EXAMPLE VI

The mixture of interfacial agents of EXAMPLE III was used to produce two inch pipe from ATH filled compositions of HDPE/PP prepared according to the following formulations:

TABLE VIA

| | (Weight Percent) | |
|---|---|---|
| | Sample 6 | Control 6 |
| HDPE II | 20 | 20 |
| PP III | 25 | 25 |
| ATH II | 54 | 54 |
| TTA/GMP3M/EDMS | 1 | — |

The compounds were extruded on the same equipment that was described in EXAMPLE V and by the same procedures except for the operating temperatures, which in this case were as follows:

TABLE VIB

| Barrel Temperatures: | |
|---|---|
| 1 (Feed): | 425° F. |
| Zone 2: | 400° F. |
| Zone 3: | 385° F. |
| Zone 4 (Front): | 375° F. |
| Die Temperature: | 350° F. |

The sample 6 formulation was converted into smooth-walled pipe and when tested according to UL showed an impact resistance of 120 ft.lbs. The control 6 composition without the synergis-tic mixture could not be extruded into satisfactory pipe.

EXAMPLE VII

This example demonstrates the effect of the istic mixture used in EXAMPLE VI on Magnesium Hydrate-filled HDPE/LLDPE blends. The following formulations were compounded, injection molded and tested as described in EXAMPLE IV:

TABLE VIIA

| | Sample 7 | Control 7 |
|---|---|---|
| HDPE III | 30 | 30 |
| LLDPE | 15 | 15 |
| MGH I | 54 | 54 |
| TTA/GMP3M/EDMS | 1 | — |

The results of testing are shown in Table VII B below:

TABLE VIIB

| | Sample 7 | Control 7 |
|---|---|---|
| Tensile Strength, psi | 5,040 | 4,120 |
| Elongation at Break, % | 29 | 17 |

EXAMPLE VIII

This example shows that a mixture of interfacial agents, TTA & TAHT, mixed in a 2:1 ratio by weight, markedly increases the ductility and impact strength while maintaining or increasing the strength and stiffness of hydrous clay filled HDPE/PP blends over a broad range of HDPE/PP ratios.

The following formulations were prepared as described in EXAMPLE I except that hydrous clay was used as the filler and that 2 wt % on the filler of the above mixture of interfacial agents was used. A parallel series of controls without the reinforcement additives were prepared in the same manner.

TABLE VIIIA

| | (Grams) | | | | | | | |
|---|---|---|---|---|---|---|---|---|
| | S8-0 | C8-0 | S8-1 | C8-1 | S8-2 | C8-2 | S8-3 | C8-3 |
| PP IV | 300 | 300 | 225 | 225 | 150 | 150 | 75 | 75 |
| HDPE II | — | — | 75 | 75 | 150 | 150 | 225 | 225 |
| Clay I | 300 | 300 | 300 | 300 | 300 | 300 | 300 | 300 |
| TTA/TAHT | 6 | — | 6 | — | 6 | — | 6 | — |

Injection molded test specimens were prepared and tested with the following results:

TABLE VIIIB

| | S8-0 | C8-0 | S8-1 | C8-1 | S8-2 | C8-2 | S8-3 | C8-3 |
|---|---|---|---|---|---|---|---|---|
| TS, psi | 4,820 | 3,120 | 4,530 | 3,340 | 5,130 | 3,360 | 5,860 | 3,260 |
| TM, ksi | 390 | 272 | 335 | 269 | 290 | 260 | 298 | 235 |
| EB, % | 4.7 | 3.2 | 7.8 | 3.0 | 12.5 | 4.7 | 18.5 | 6.4 |
| FS, psi | 9,060 | 5,760 | 8,160 | 6,460 | 7,250 | 5,910 | 7,020 | 5,650 |
| FM, ksi | 520 | 380 | 420 | 400 | 350 | 350 | 350 | 330 |
| Notch Izod | 0.6 | 0.2 | 1.5 | 0.4 | 2.3 | 0.7 | 3.9 | 0.4 |
| Flex Resist* | 2 | 1 | 5 | 1 | 8 | 1 | 8 | 1 |

*Rating: 1 Very Poor to 10 Excellent

The property profiles of the PP/HDPE blend formulations containing the compatibilizing system (S8-1 through S8-3) are seen to be vastly superior to those of all the control formulations without the reinforcement additives (C8-1 through C8-3). Note in particular the great increases in flex resistance, impact strength (notched Izod) and ductility (EB), which remain quite poor in the absence of the reinforcement additive. Note also that significant improvements are achieved in strength (TS, FS) and stiffness (TM, FM). The simultaneous improvements in toughness ductility, strength and stiffness is a rare and commercially very valuable result in formulating particulate filled plastic composites.

These data illustrate dramatically how a compatibilizing system applied to a blend of thermoplastics, by overcoming the compatibility deficiencies of the polymer blend, can transform an originally brittle material as in the controls (C8-0) into a range of highly useful ductile, tough and strong new materials in the samples, (S8-1 through 3). In contrast, the filled mixture of polymers without reinforcement additives remain deficient in many properties including toughness, strength and stiffness. (C8-1 through C8-3).

EXAMPLE IX

This example shows that (TTA+GMP3M+EDMS) a mixture of interfacial agents plus a surfactant used in a ratio by weight of (1:1:0.75), markedly increases the ductility and impact strength while simultaneously increasing both the strength and stiffness of ATH filled blends of PP with LLDPE.

The following formulations were prepared as described in EXAMPLE I except that PP/LLDPE blends were used instead of PP/HDPE blends and the above mentioned reinforcement additive was used at a concentration of 2 wt % on the ATH. A parallel series of controls without the reinforcement promoter were prepared in the same manner.

TABLE IX

| | (Grams) | | | | | | | |
|---|---|---|---|---|---|---|---|---|
| | S9-0 | C9-0 | S9-1 | C9-1 | S9-2 | C9-2 | S9-3 | C9-3 |
| PP IV | 300 | 300 | 225 | 225 | 150 | 150 | 75 | 75 |
| LLDPE | — | — | 75 | 75 | 150 | 150 | 225 | 225 |
| ATH | 300 | 300 | 300 | 300 | 300 | 300 | 300 | 300 |
| TTA/A-174/EDMS | 6 | — | 6 | — | 6 | — | 6 | — |

The injection molded samples were tested with the following results:

TABLE IXB

| | S9-0 | C9-0 | S9-1 | C9-1 | S9-2 | C9-2 | S9-3 | C9-3 |
|---|---|---|---|---|---|---|---|---|
| TS, psi | 4,330 | 2,450 | 3,590 | 2,700 | 3,770 | 2,450 | 2,310 | 2,570 |
| TM, ksi | 323 | 248 | 251 | 219 | 179 | 176 | 120 | 110 |
| EB, % | 12.7 | 2.9 | 72 | 2.8 | 76 | 6.2 | 112 | 22.5 |
| FS, psi | 8,110 | 5,410 | 6,610 | 5,200 | 5,320 | 4,780 | 3,330 | 3,330 |
| FM, ksi | 490 | 280 | 310 | 290 | 250 | 260 | 150 | 150 |
| Notch Izod | 1.0 | 0.5 | 3.1 | 1.7 | 8.9 | 5.4 | >10 | 8.4 |
| Flex Resist* | 5 | 1 | 10 | 1 | 10 | 2 | 10 | 2 |

*Rating: 1 Very Poor to 10 Excellent

The property profiles of the PP/LLDPE blend formulations S9-1 through S9-3 are clearly very superior to the control formulations C9-1 through C9-3 and to C9-0, i.e. ATH filled PP without the reinforcement additives. Note in particular the great increases in flex resistance, impact strength (notched Izod) and ductility (EB) resulting from the use of the reinforcement additives. Note also that significant improvements are achieved simultaneously in strength (TS, FS) and stiffness (TM, FM), which is a rare and commercially very valuable result in formulating particulate filled plastic composites.

The surfaces of the injection molded S-series samples of PP/LLDPE blends containing the compatibilizing system were smooth and uniform whereas the corresponding control C-series samples were severely mottled. Furthermore, on manual bending, the S series samples showed very little stress whitening, and even that slight amount was recovered when the samples were bent back to their original shape. In contrast, all of the C-series blends showed severe stress whitening on bending, which was irreversibly retained. These effects are dramatic, visual manifestations of the compatibilizing effect of the compatibilizing system (reinforcement additive treated mineral filler).

This example again illustrates that reinforcement additives by overcoming the inherent compatibility deficiencies of the polymer blend, can transform an originally weak and brittle material (C9-0) into a range of highly useful ductile, tough and strong new materials (S9-1 through 3).

EXAMPLE X

This example illustrates in situ synthesis of a reinforcement promoter on a filler surface from two precursors, which in themselves are not reinforcement promoters. Calcium Carbonate was treated first with TETA and subsequently with MAH in accordance with the teachings of U.S. Pat. No. 4,385,136, Re. 31,992, Example 12, the ratio of TETA to MAH being 3:2 by weight. The treated filler was then used to compatibilize blends of a propylene homopolymer with a rubbery ethylene/propylene copolymer, EPDM. Even though EPDM sometimes is used commercially to alleviate the natural brittleness of propylene homopolymers, this is accomplished at a sacrifice in other mechanical properties. The data in this example show that—for the same level of toughness—superior mechanical and thermal properties are achieved through the use of reinforcement promoter treated fillers.

The following formulations were prepared as described in EXAMPLE I except that PP/EPDM blends were used instead of PP/HDPE and the filler used was Calcium Carbonate treated as described above at a final reinforcement promotor concentration of 2 wt % on the filler. A parallel series of controls without the reinforcement promotor treatment of the filler were prepared in the same manner.

TABLE XA

| | (Grams) | | | | | |
|---|---|---|---|---|---|---|
| | S10-0 | C10-0 | S10-1 | C10-1 | S10-2 | C10-2 |
| PP IV | 300 | 300 | 225 | 225 | 150 | 150 |
| EPDM | — | — | 75 | 75 | 150 | 150 |
| CaCO$_3$ | 300 | 300 | 300 | 300 | 300 | 300 |
| TETA/MAH (3:2) | 6 | — | 6 | — | 6 | — |

The injection molded samples were tested with the following results:

TABLE XB

| | S10-0 | C10-0 | S10-1 | C10-1 | S10-2 | C10-2 |
|---|---|---|---|---|---|---|
| TS, psi | 3,210 | 1,910 | 2,950 | 2,340 | 1,890 | 1,000 |
| TM, ksi | 311 | N/A | 251 | 219 | 179 | 176 |
| EB, % | 2.5 | 7.0 | 70 | 24 | 94 | 111 |
| FS, psi | 8,110 | 5,410 | 6,610 | 5,200 | 5,320 | 4,780 |
| FM, ksi | 490 | 280 | 310 | 290 | 250 | 260 |
| Notch Izod | 1.3 | 0.3 | 5.1 | 2.5 | 10.7 | 8.7 |
| Flex Resist* | 5 | 1 | 10 | 8 | 10 | 10 |

*Rating: 1 Very Poor to 10 Excellent

The property profiles of the PP/EPDM blend formulations S9-1 and S9-2 are clearly superior to those of S9-0 (straight PP) and to those of the corresponding control formulations C9-1, C9-2 and C9-0. Note in particular that the increases in flex resistance, impact strength (notched Izod) and ductility (EB) are achieved at a lesser sacrifice in other mechanical properties such as strength (TS, FS) and stiffness (TM, FM). The practical significance of these results are that it is possible—through the use of reinforcement additives—to achieve the very desirable improvements in the toughness and ductility of filled polypropylene homopolymers at lower concentrations of the elastomeric polymer component, here EPDM, hence at even less sacrifice in mechanical properties when the compounds are formulated on the basis of equal toughness or ductility.

When tested manually, the S10-1 and S10-2 samples showed much better snap back (recovery) than the corresponding control samples, again visually testifying to the compatibilizing effect of a reinforcement additive treated filler.

EXAMPLE XI

This example shows that treatment of talc with the reinforcement additive MTA results in significant improvements in the mechanical properties of talc filled HDPE/PP blends, especially the toughness. This is commercially significant because talc is a naturally hydrophobic filler with inherently good wetting and dispersibility in non-polar resins. Prior attempts at improving talc performance in polyolefins by surface treatments have been largely unsuccessful.

The following formulations were prepared as described in EXAMPLE I except that talc was used as the filler and MTA was used as the reinforcement additive at a concentration of 2 wt % on the filler. A parallel series of controls without the reinforcement additive were prepared in the same manner.

TABLE XI A

| | (Grams) | | | | | | | |
|---|---|---|---|---|---|---|---|---|
| | S11-0 | C11-0 | S11-1 | C11-1 | S11-2 | C11-2 | S11-3 | C11-3 |
| PP IV | 300 | 300 | 225 | 225 | 150 | 150 | 75 | 75 |
| LLDPE | — | — | 75 | 75 | 150 | 150 | 225 | 225 |
| Talc | 300 | 300 | 300 | 300 | 300 | 300 | 300 | 300 |

TABLE XI A-continued

| | S11-0 | C11-0 | S11-1 | C11-1 | S11-2 | C11-2 | S11-3 | C11-3 |
|---|---|---|---|---|---|---|---|---|
| | | | (Grams) | | | | | |
| MTA | 6 | — | 6 | — | 6 | — | 6 | — |

Injection molded samples were prepared and tested with the following results:

TABLE XI B

| | S11-0 | C11-0 | S11-1 | C11-1 | S11-2 | C11-2 | S11-3 | C11-3 |
|---|---|---|---|---|---|---|---|---|
| TS, psi | 4,770 | 4,040 | 4,560 | 3,920 | 4,300 | 3,620 | 3,870 | 2,660 |
| TM, ksi | 392 | 365 | 341 | 322 | 317 | 287 | 287 | 258 |
| EB, % | 4.3 | 2.5 | 5.8 | 3.4 | 6.5 | 4.6 | 9.1 | 8.6 |
| FS, psi | 8,450 | 7,220 | 7,530 | 6,950 | 7,020 | 6,540 | 6,350 | 5,950 |
| HDT, °C., 264 psi | 92 | 88 | 80 | 77 | 75 | 68 | 70 | 70 |
| Notch Izod | 0.5 | 0.3 | 0.9 | 0.5 | 1.6 | 1.3 | 2.5 | 1.9 |

Talc is a popular mineral filler in propylene homopolymers- because it disperses well and is quite efficient in raising the stiffness and the resistance to creep at elevated temperature, as measured through the heat distortion temperature (HDT). Unfortunately, the toughness (Izod) and ductility (EB) are unacceptable for many applications. An increase in Izod from the brittle range of 0.5-0.9 to a range of good toughness of, say, 1.0-2.0 is therefore very important in many applications specially when it can be achieved at minimal sacrifice in strength, stiffness and high temperature creep as shown here for the reinforcement promoter treated talc in HDPE/PP blends. Hence, the compatibilizing effect of reinforcement promoter treated talc is another example of the utility of the present invention.

That which is claimed is:

1. A mixture of incompatible thermoplastic hydrocarbon polymers prepared, in the substantial absence of free radical intitators, by a process comprising mixing: (I) a first thermoplastic hydrocarbon polymer and (II) a second theromoplastic hydrocarbon polymer that is incompatible with the first hydrocarbon polymer, and (III) a compatibilizing mixture comprising:
   (a) an inorganic filler; and
   (b) from about 0.1 to 5.0 weight percent, based on the weight of (I), (II), and (III), of a reinforcement additive selected from the group consisting of:
      (i) a mixture comprising two interfacial agents wherein:
         (A) said agents are capable of copolymerization with each other;
         (B) at least one agent contains at least one reactive olefinic double bond capable of mechanochemical grafting to the polymers;
         (C) one agent is more highly adsorbable onto the filler surface while the other agent is more highly soluble in the filled polymers; and
         (D) said agents have a synergy index, S, being greater than zero, which is defined by the formula:

$$S = 50(Q_A + Q_S - 0.2)(1 - 10R°_f)(0.5 - \Delta^2)$$

wherein:
$Q_A$ and $Q_S$ are the Alfrey-Price resonance parameters of the most reactive olefinic double bonds in the adsorbable and soluble agents, respectively;
$R°_f$ is the relative flow ratio of the adsorbable agent measured by thin layer chromatography on a neutral silica gel using xylene as the eluant and di-n-butyl fumarate as the standard; and
$\Delta$ is the difference between the Hildebrand solubility parameter of the soluble agent and that of the major polymer component; and
      (ii) a reinforcement promotor having at least two reactive olefinic double bonds, said promoter being characterized by having a promoter index, P, being being greater than zero, which is defined by the formula:

$$P = n(n-1)Q(e+2)(1 - 2R°_f) - 2.5$$

wherein:
n is the number of olefinic double bonds in the promoter, and has a value of at least 2;
Q and e are the Alfrey-Price resonance and polarity parameters, respectively, of at least one of the olefinic double bonds in the compound;
Q is greater than 0;
e is greater than 0; and
$R°_f$ has a value less than 0.5 and is the relative flow ratio of the promoter measured by thin layer chromatography on a neutral silica gel using xylene as the eluant and di-n-butyl fumarate as the standard.

2. The mixture of claim 1 wherein the reinforcement additive selected is the reinforcement promoter.

3. The mixture of claim 1 wherein the reinforcement additive selected is the mixture of interfacial agents.

4. The mixture of claim 2 wherein the reinforcement promoter has the structure:

$$R^1 \left[ \begin{array}{c} R^2 \\ | \\ (X)_m C = C \\ | \quad | \\ R^3 \quad R^4 \end{array} \right]_n$$

wherein $R^1$ is an organic group free of olefinic or acetylenic unsaturation having a valence of n; $R^2$, and $R^3$ and $R^4$ are hydrogen, carboxy, or monovalent organic groups free of olefinic or acetylenic unsaturation; X is:

$$-\underset{\underset{H}{|}}{N}-\underset{\underset{}{\|}}{\overset{O}{C}}-, \quad -O-\underset{\underset{}{\|}}{\overset{O}{C}}-, \text{ or } -\underset{\underset{}{\|}}{\overset{O}{C}}-;$$

m has a value of 0 or 1; and n has a value of at least two.

5. The mixture of claim 4 wherein the reinforcement promoter has an $R^1$ or X group, for when m is 0 or 1, respectively, which contains a double or triple bond which is in conjugation with the olefinic bond and which is electron withdrawing.

6. The mixture of claim 2 wherein the reinforcement promoter is a condensation product of an acrylic or maleic acid with a aliphatic, aromatic or heterocyclic polyol; or an acyrlamide, maleimide, or maleamic acid of an apliphatic, aromatic, or heterocyclic polyamine.

7. The mixture of claim 6 wherein the reinforcement promoter compound is an imide, maleate, acrylate, or acryloyl heterocyclic compound.

8. The mixture of claim 7 wherein the reinforcement promoter is 1,3,5-triacryloylhexahydro-s-triazine, melamine triacrylate, or maleamic acid deriatives of methylene-aniline oligomers.

9. The mixture of claim 3 wherein the soluble interfacial agent is trimethylopropane triacylate and the adsorbable interfacial agent is either gamma-trimethacryloxypropyl methoxy silane hydrolyzate or 1,3,5-triacryloyl-hexahydro-s-triazine.

10. The mixture of claim 1 wherein the filler is present in an amount of from about 10 to 90 weight percent and the amount of first and second polymers are from about 10 to 90 weight percent, based on the total weight of filler and polymer in the composition.

11. The mixture of claim 1 wherein the weight:weight ratio of the first polymer to the second polymer ranges from 1:20 to 20:1.

12. The mixture of claim 1 wherein the weight:weight ratio of the first polymer to the second polymer ranges from 1:10 to 10:1.

13. The mixture of claim 1 wherein said first and second polymers are each a polyolefin homopolymer or copolymer.

14. The mixture of claim 1 wherein the inorganic filler is aluminum trihydrate, magnesium hydrate, clay, talc, or calcium carbonate.

15. A mixture of incompatible hydrocarbon polymers prepared, in the substantial absence of free radical intiators, by a process comprising mixing (I) a first hydrocarbon polymer and (II) a second hdyrocarbon polymer incompatible with the first hydrocarbon polymer, and (III) a compatiblizing system comprisnng:
(a) an inorganic filler;
(b) a polymerizable unsaturated organic compound having at least two polymerizable unsaturated groups;
(c) a vinyl-polymerizable unsaturated, hydrolyzable silane; and
(d) a surfactant comprising
  (i) a siloxane containing at least one silicon-bonded alkyl group having at least 12 carbon atoms; or
  (ii) a polyoxyalkylene compound having one or more polyoxyalkylene blocks, each bonded at one eng to a siloxane block, an allkyl group having at least 12 carbon atoms, or an alkenyl group, and bonded at the other end to an alkoxy group, an acetoxy group, a silixane block, or a hydroxy group.

16. The mixture of claim 15 wherein the surfactant is the compound represented by the formula:

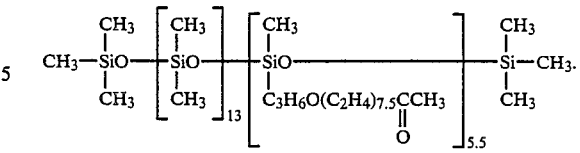

17. The mixture of claim 15 wherein the filler is aluminum trighydrate, magnesium hydroxide, or magnesium carbonate/hydrate.

18. An extruded tubing comprising the mixture of claim 1.

19. An extruded tubing comprising the mixture of claim 15.

20. A mixture of incompatible thermoplastic hydrocarbon polymers, substantially free of free radical initiators, comprising: (I) a first thermoplastic hydrocarbon polymer and (II) a second thermoplastic hydrocarbon polymer that is incompatible with the first hydrocarbon polymer, and (III) a compatibilizing mixture comprising:
(a) an inorganic filler; and
(b) from about 0.1 to 5.0 weight percent, based on the weight of (I), (II), and (III), of a reinforcement additive selected from the group consisting of:
  (i) a mixture comprising two interfacial agents wherein:
   (A) said agents are capable of copolymerization with each other;
   (B) at least one agent contains at least one reactive olefinic double bond capable of mechanochemical grafting to the polymers;
   (C) one agent is more highly adsorbable onto the filler surface while the other agent is more highly soluble in the filled polymers; and
   (D) said agents have a synergy index, S, being greater than zero, which is defined by the formula:

$$S = 50(Q_A + Q_S - 0.2)(1 - 10R°_f)(0.5 - \Delta^2)$$

wherein:
$Q_A$ and $Q_S$ are the Alfrey-Price resonance parameters of the most reaotive olefinic double bonds in the adsorbable and soluble agents, respectively;
$R°_f$ is the relative flow ratio of the adsorbable agent measured by thin layer chromatography on a neutral silica gel using xylene as the eluant and di-n-butyl fumarate as the standard; and
$\Delta$ is the difference between the Hildebrand solubility parameter of the soluble agent and that of the major polymer component; and
  (ii) a reinforcement promoter having at least two reactive olefinic double bonds, said promoter being characterized by having a promoter index, P, being greater than zero, which is defined by the formula:

$$P = n(n-1)Q(e+2)(1 - 2 R°_f) - 2.5$$

wherein:
n is the number of olefinic double bonds in the promoter, and has a value of at least 2;
Q and e are the Alfrey-Price resonance and polarity parameters, respectively, of at least one of the olefinic double bonds in the compound;

Q is greater than 0;
e is greater than 0; and
R°$_f$ has a value less than 0.5 and is the relative flow ratio of the promoter measured by thin layer chromatography on a neutral silica gel using xylene as the eluant and di-n-butyl fumarate as the standard.

21. The mixture of claim 20 wherein the reinforcement additive selective is the reinforcement promoter.

22. The mixture of claim 20 wherein the reinforcement additive selected is the mixture of interfacial agents.

23. The mixture of claim 21 wherein the reinforcement promoter has the structure:

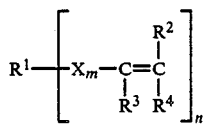

wherein $R^1$ is an organic group free of olefinic or acetylenic unsaturation having a valence of n; $R^2$, and $R^3$, and $R^4$ are hydrogen, carboxy, or monovalent organic groups free of olefinic or acetyleneic unstaursation; X is:

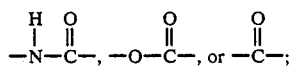

m has a value of 0 or 1; and n has a value of at least two.

24. The mixture of claim 23 wherein the reinforcement promoter has has an $R^1$ or X group, for when m is 0 or 1, respectively, which contains a double or triple bond which is in conjugation with the olefinic bond and which is electron withdrawing.

25. The mixture of claim 21 wherein the reinforcement promoter is a condensation product of an acrylic or maleic acid with a aliphatic, aromatic, or heterocyclic polyol; or an acrylamide, maleimide, or maleamic acid of an aliphatic, aromatic, or heterocyclic polyamine.

26. The mixture of claim 25 wherein the reinforcement promoter compound is an imide, maleate, acrylate, or acryloyl heterocyclic compound.

27. The mixtures of claim 26 wherein the reinforcement promoter is 1,3,5-triacryloylhexahydro-s-triazine, melamine triacrylate, or maleamic acid derivatives of methylene-aniline oligomers.

28. The mixture of claim 22 wherein the soluble interfascial agent is trimethylolpropane triacrylate and the adsorbable interfacial agent is either gamma-trimethacryloxypropyl methoxy silane hydrolyzate or 1,3,5-triacryloyl-hexahydro-s-triazine.

29. The mixture of claim 20 wherein the filler is present in an amount of from about 10 to 90 weight percent and the amount of first and second polymers are from about 10 to 90 weight percent, based on the total weight of filler and polymer in the composition.

30. The mixture of claim 20 wherein the weight:weight ratio of the first polymer to the second polymer ranges from 1:20 to 20:1.

31. The mixture of claim 20 wherein the weight:weight ratio of the first polymer to the second polymer ranges from 1:10 to 10:1.

32. The mixture of claim 20 wherein said first and second polymers are each a polyolefin homopolymer or copolymer.

33. The mixture of claim 20 wherein the inorganic filler is aluminum trihydrate, magnesium hydrate, clay, talc, or calcium carbonate.

34. A mixture of incompatible hydrocarbon polymers, substantially free of free radical initiators, comprising (I) a first hydrocarbon polymer and (II) a second hydrocarbon polymer incompatible with the first hydrocarbon polymer, and (III) a compatibilizing system comprising:
(a) an inorganic filler;
(b) a polymerizable unsaturated organic compound having at least two polymerizable unsaturated groups;
(c) a vinyl-polymerizable unsaturated, hydrolyzable silane; and
(d) a surfactant comprising
  (i) a siloxane containing at least one silicon-bonded alkyl group having at least 12 carbon atoms; or
  (ii) a polyoxyalkylene compound having one or more polyoxyalkylene blocks, each bonded at one end to a siloxane block, an alkyl group having at least 12 carbon atoms, or an alkenyl group, and bonded at the other end to an alkoxy group, an acetoxy group, a siloxane block, or a hydroxy group.

35. The mixture of claim 34 wherein the surfactant is the compound represented by the formula:

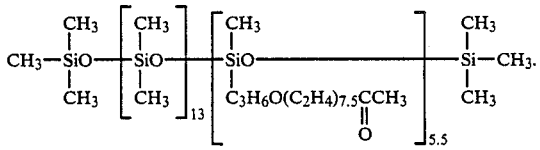

36. The mixture of claim 34 wherein the filler is aluminum trihydrate, magnesium hydroxide, or magnesium carbonate/hydrate.

37. An extruded tubing comprising the mixture of claim 20.

38. An extruded tubing comprising the mixture of claim 34.

* * * * *

UNITED STATES PATENT AND TRADEMARK OFFICE
CERTIFICATE OF CORRECTION

PATENT NO. : 4,873,116

DATED : October 10, 1989

INVENTOR(S) : Fred H. Ancker

It is certified that error appears in the above-identified patent and that said Letters Patent is hereby corrected as shown below:

Column 30, line 26, delete "being" (second occurrence); column 31, line 7, correct the spelling of acrylamide, line 61, correct the spelling of end and alkyl, line 65, correct the spelling of siloxane; and column 32, line 11, correct the spelling of trihydrate, line 46, correct the spelling of reactive.

Column 18, line 50, column 20, line 63, column 32, line 5, and column 34, line 45, in the formula, "$(C_2H_4)$" should read -- $(C_2H_4O)$ --.

Signed and Sealed this

Tenth Day of April, 1990

Attest:

HARRY F. MANBECK, JR.

*Attesting Officer*  *Commissioner of Patents and Trademarks*